3,388,926
WHEELCHAIR STEERING APPARATUS
George P. Bardsley, W. Larchmont Drive, Colts Neck, N.J. 07722; Larry R. Questad, 302 E. Callender, Livingston, Mont. 95334; John F. Mason, 3341 Cottage Way, Apt. 51, Sacramento, Calif. 95825; John R. Sondeno, 743 South St., Hollister, Calif. 95023; and Charles R. Smith, Jr., 4700 Paseo de las Tortugas, Torrance, Calif. 90505
Filed June 6, 1966, Ser. No. 555,417
3 Claims. (Cl. 280—265)

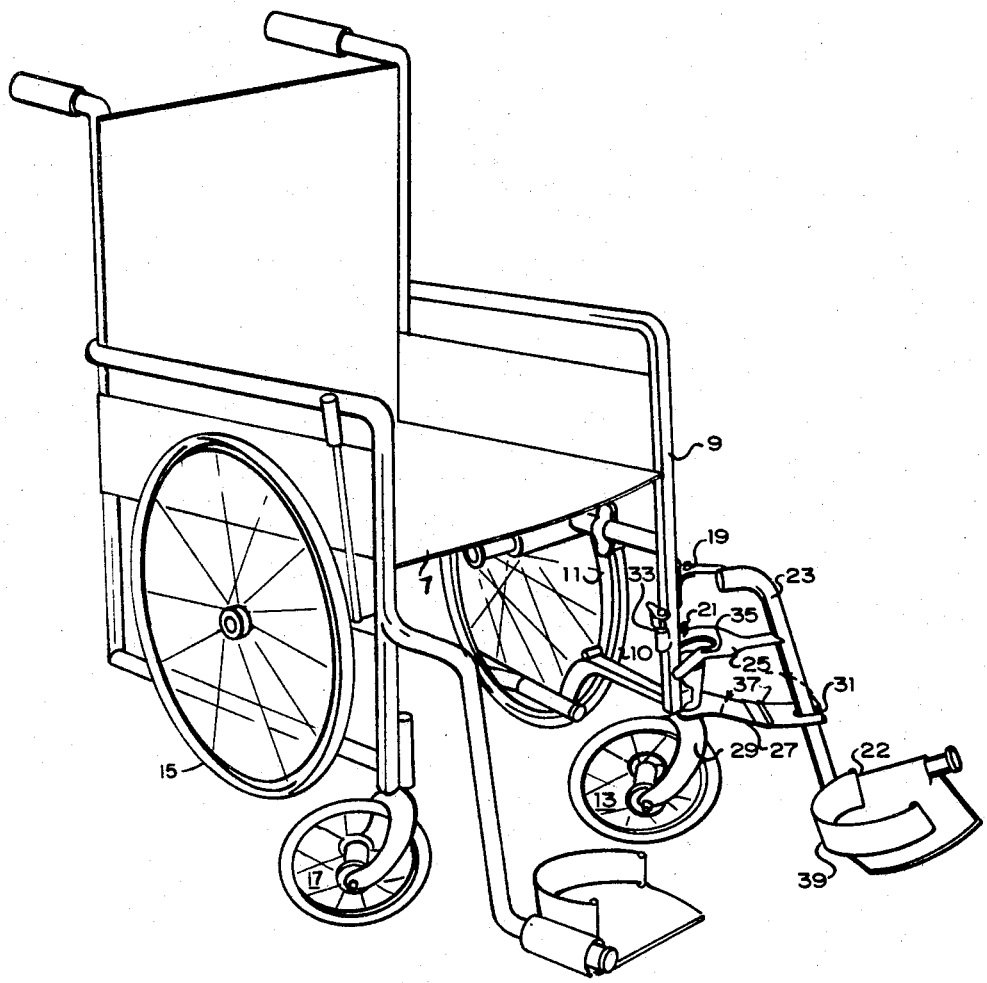

ABSTRACT OF THE DISCLOSURE

Wheelchair steering apparatus enables a wheelchair occupant having one lateral side immobilized (referred to as hemiplegics herein) to steer the wheelchair with the remaining normally responsive leg and foot. Apparatus of this type thus leaves the remaining, normally responsive hand and arm of the wheelchair patient free to supply manual power to one wheel for propelling the wheelchair.

---

It is therefore the main object of the present invention to provide foot-controlled steering apparatus for a wheelchair.

It is another object of the present invention to provide a foot rest for a wheelchair which serves as a steering member.

In accordance with the illustrated embodiment of the present invention, a foot rest is pivotally attached to the frame of a wheelchair for rotation about a vertical axis. Mechanical linkage is provided between a caster support wheel of the wheelchair and the foot rest for steering the caster in response to angular movement of the foot rest about its rotational axis.

Other and incidental objects of the present invention will be apparent from a reading of this specification and an inspection of the accompanying drawing which shows a perspective view of the wheelchair apparatus of the present invention.

The single view shows the steering apparatus in its operative position.

Referring to the drawing, there is shown a wheelchair including a seat 7 mounted on a frame 9 supported on rearwardly disposed propelling wheels 11, 15 and on forwardly disposed caster wheels 13, 17 of the type which are pivoted to rotate about a substantially vertical axis. A pair of pivot pins 19, 21 are mounted on a forward portion of frame 9 on the side thereof which corresponds to the normally responsive side of a hemiplegic occupant of the wheelchair. These pins 19, 21 are vertically arranged in line with or near the vertical axis of rotation of the caster 13 for pivotally supporting the foot rest 22 and support arm 23. The upper pivot pin 19 receives the upper end of the support arm 23 and lower pivot pin 21 receives one side of a yoke member 25 which is rigidly attached to the support arm 23 at a point thereon intermediate its ends. The foot rest 22 and support arm 23 are thus free to pivot about a vertical axis passing through the pivot pins 19, 21 in response to the movement of the leg and foot of the occupant of the wheelchair. This pivotal movement of the foot rest 22 and support arm 23 is coupled to the caster 13 by the steering bar 27 which is rigidly attached at one of its ends to the fork 29 of caster 13 and which is disposed to receive the support arm 23 in the slot 31 at its opposite end.

In operation, the present wheelchair may be propelled in a conventional manner by supplying manual power to the handrail 10 attached to the rear wheel 11. Directional control of the present wheelchair is provided simply by the occupant moving or pointing his leg and foot in the desired direction of travel. This causes the foot rest 22 and support arm 23 to rotate on pivot pins 19, 21 to a certain angular position relative to the normal or fore-and-aft axis of the wheelchair. This, in turn, sets the caster 13 to substantially the same angular position about its pivot axis relative to the normal axis of the wheelchair, thus controlling the direction of travel of the wheelchair. The remaining caster 17 merely rotates about its vertical pivot axis to follow the steered caster 13 along the direction of travel.

The foot rest 22 and support arm 23 may be locked into position when not required for steering merely by engaging lock pin 33 with the hole 35 in the remaining side of yoke member 25, thereby preventing foot rest 22 and support arm 23 from rotating on the pivot pins 19, 21. At the same time, caster 13 may be mechanically uncoupled from the support arm 23 for free rotation of the caster 13 about its vertical pivot axis merely by folding back the slotted end 31 of the steering bar 27 at the hinged joint 37. Thus with these two simple alterations, the present wheelchair may be converted for use as a conventional wheelchair. Strap 39 is strug between upstanding end posts attached to the foot rest 22 to retain the foot of the occupant in position on the foot rest 22 during steering maneuvers and the foot rest 22 may be conventionally pivotally supported on the lower end of support arm 23 as shown. It should be understood that the steering apparatus of the present invention is equally applicable for use on either side of a wheelchair thus described.

Therefore, the wheelchair steering apparatus of the present invention enables a hemiplegic to steer his wheelchair with his normally responsive leg and foot and thereby leave the normally responsive arm and hand free for supplying only the manual power required to propel the wheelchair.

We claim:
1. Wheelchair apparatus comprising:
   an occupant-supporting base carried on a frame supported on a plurality of wheels, at least one of said wheels being pivotally attached to said frame to rotate about a substantially vertical first axis for determining the direction of travel of said wheelchair;
   a foot rest attached to a support arm;
   means pivotally supporting said support arm on said frame for rotational motion of the support arm and foot rest about a second axis which is substantially vertical and substantially in line with the first axis for said one wheel; and
   linkage means coupling said foot rest and support arm to said one wheel for altering the angular position thereof about the first axis and relative to said frame in response to movement of said foot rest and support arm about the second axis.
2. Wheelchair apparatus as in claim 1 wherein:
   the foot rest attached to said support arm is disposed away from said one wheel substantially in the direction therefrom of forward movement of the wheelchair; and said linkage means includes a steering bar attached to said one wheel to extend substantially radially outwardly therefrom relative to the first pivot axis for selectively coupling to said support arm to rotate said one wheel and the steering bar about the first pivot axis in response to rotation of the support arm about the second pivot axis.

3. Wheelchair apparatus as in claim 1 wherein:

said linkage means includes a steering bar attached to said one wheel and having a slot in the end thereof remote from said one wheel for receiving the support arm therein; and said steering bar includes a hinged joint for folding back the slotted end portion of the steering bar away from said support arm for selectively uncoupling said one wheel from the support arm.

References Cited

UNITED STATES PATENTS

| | | | |
|---|---|---|---|
| 997,439 | 4/1911 | Crockett | 280—265 |
| 1,304,790 | 5/7919 | Maulden et al. | 280—265 |
| 1,509,215 | 9/1924 | Slater | 280—265 X |
| 2,368,142 | 1/1945 | Kelley | 280—265 |
| 3,017,199 | 1/1962 | Sechrist. | |
| 3,042,131 | 7/1962 | Dovci | 280—272 X |

KENNETH H. BETTS, *Primary Examiner.*